(12) United States Patent
Kumar et al.

(10) Patent No.: US 11,156,791 B2
(45) Date of Patent: Oct. 26, 2021

(54) BENDABLE OPTICAL FIBER RIBBON

(71) Applicant: Sterlite Technologies Limited, Gurgaon (IN)

(72) Inventors: Sravan Kumar, Gurgaon (IN); Hemanth Kondapalli, Gurgaon (IN); Vikash Shukla, Gurgaon (IN); Atulkumar Mishra, Gurgaon (IN); Kishore Chandra Sahoo, Gurgaon (IN)

(73) Assignee: STERLITE TECHNOLOGIES LIMITED, Gurgaon (IN)

( * ) Notice: Subject to any disclaimer, the term of this patent is extended or adjusted under 35 U.S.C. 154(b) by 0 days.

(21) Appl. No.: 16/801,606

(22) Filed: Feb. 26, 2020

(65) Prior Publication Data
US 2021/0116657 A1    Apr. 22, 2021

(30) Foreign Application Priority Data
Oct. 21, 2019    (IN) .............................. 201911042647

(51) Int. Cl.
    *G02B 6/44*    (2006.01)
(52) U.S. Cl.
    CPC .................................. *G02B 6/4403* (2013.01)
(58) Field of Classification Search
    CPC .................................................. G02B 6/4403
    USPC .......................................................... 385/114
    See application file for complete search history.

(56) References Cited

U.S. PATENT DOCUMENTS

| | | | | |
|---|---|---|---|---|
| 6,459,068 | B1 * | 10/2002 | Yamaura | B23K 26/0604 |
| | | | | 219/121.6 |
| 2009/0034922 | A1 * | 2/2009 | Yasutomi | G02B 6/4433 |
| | | | | 385/113 |
| 2009/0190890 | A1 * | 7/2009 | Freeland | G02B 6/4433 |
| | | | | 385/111 |
| 2010/0092140 | A1 * | 4/2010 | Overton | G02B 6/02395 |
| | | | | 385/112 |
| 2010/0135625 | A1 * | 6/2010 | Overton | G02B 1/048 |
| | | | | 385/114 |
| 2016/0216468 | A1 * | 7/2016 | Gimblet | G02B 6/4404 |
| 2018/0188464 | A1 * | 7/2018 | Peterson, III | G02B 6/4435 |

* cited by examiner

*Primary Examiner* — Jerry M Blevins

(57) ABSTRACT

The present disclosure provides a stacking arrangement of an optical fiber ribbon in a buffer tube of an optical fiber cable. The stacking arrangement includes optical fiber ribbon stack, first bendable optical fiber ribbon, second bendable optical fiber ribbon, third bendable optical fiber ribbon, fourth bendable optical fiber ribbon and optical fiber ribbons. The optical fiber ribbon stack includes at least four corners. Each optical fiber at the corresponding four corners of the optical fiber ribbon stack is a bend insensitive optical fiber. One or more optical fibers are placed adjacent to each other at the corresponding four corners of the optical fiber ribbon stack.

12 Claims, 3 Drawing Sheets

100

200

300

BENDABLE OPTICAL FIBER RIBBON

TECHNICAL FIELD

The present disclosure relates to the field of optical fiber ribbons and, in particular, relates to a bendable optical fiber ribbon. The present application is based on, and claims priority from an Indian Application Number 201911042647 filed on 21 Oct. 2019, the disclosure of which is hereby incorporated by reference herein.

BACKGROUND

With the advancement of science and technology, various modern technologies are being employed for communication purposes. One of the most important modern communication technologies is the optical fiber communication technology using a variety of optical fiber cables. One such type of optical fiber cables is an optical fiber ribbon cable. Generally, the optical fiber ribbon cable is made of optical fiber ribbons placed inside a cable. Conventionally, the optical fiber ribbons comprise of bend sensitive optical fibers placed in a linear manner. The optical fibers placed on edge of the optical fiber ribbon undergo a large amount of stress. The large amount of stress generated further leads to high attenuation losses in data transmission. In addition, the conventional optical fiber ribbons are not flexible. As a result, the conventional optical fiber ribbons are not able to withstand stresses and this leads to breakdown during stress conditions.

In light of the foregoing discussion, there exists a need for a bendable optical fiber ribbon which overcomes the above cited drawbacks of conventionally known optical fiber ribbons.

BRIEF SUMMARY OF THE INVENTION

The present disclosure relates to a stacking arrangement of an optical fiber ribbon in a buffer tube of an optical fiber cable. The stacking arrangement includes an optical fiber ribbon stack. The optical fiber ribbon stack includes at least four corners. Each optical fiber at each of the four corners of the optical fiber ribbon stack is a bend insensitive optical fiber. One or more optical fibers adjacent to each corner optical fiber at each of the four corners of the optical fiber ribbon stack and placed horizontally, vertically and diagonally to each corner optical fiber are bend insensitive optical fibers in such a way that group of bend insensitive optical fibers on each of the four corners of the optical fiber ribbon stack is in the form of a square matrix.

A primary object of the present disclosure is to provide a bendable optical fiber ribbon.

Another object of the present disclosure is to provide the bendable optical fiber ribbon with lower dimensions.

Yet another object of the present disclosure is to provide the bendable optical fiber ribbon with better flexibility.

Yet another object of the present disclosure is to provide the bendable optical fiber ribbon with lesser amount of stress.

In an embodiment of the present disclosure, the at least four optical fibers on each corner of the optical fiber ribbon stack are bend insensitive.

In an embodiment of the present disclosure, the optical fiber ribbon stack includes a plurality of bendable optical fiber ribbons.

In an embodiment of the present disclosure, the optical fiber ribbon stack is a square shaped ribbon stack.

In an embodiment of the present disclosure, each of a plurality of optical fibers of the optical fiber ribbon has a diameter in a range of about 180 micrometers to 220 micrometers.

In an embodiment of the present disclosure, each of the plurality of optical fibers of the optical fiber ribbon is aligned at a pitch of about 180 micrometers to 250 micrometers.

In an embodiment of the present disclosure, the optical fiber ribbon has width in a range of about 2.8 millimeters to 3.1 millimeters.

In an embodiment of the present disclosure, the optical fiber ribbon has a height in a range of about 240 micrometers to 300 micrometers.

In an embodiment of the present disclosure, the optical fiber ribbon stack has a width in a range of about 5.8 millimeters to 6.2 millimeters.

In an embodiment of the present disclosure, the optical fiber ribbon stack has a height in a range of about 5.8 millimeters to 6.2 millimeters.

DESCRIPTION OF THE DRAWINGS

In order to best describe the manner in which the above-described embodiments are implemented, as well as define other advantages and features of the disclosure, a more particular description is provided below and is illustrated in the appended drawings. Understanding that these drawings depict only exemplary embodiments of the invention and are not therefore to be considered to be limiting in scope, the examples will be described and explained with additional specificity and detail through the use of the accompanying drawings in which.

Figure 1:
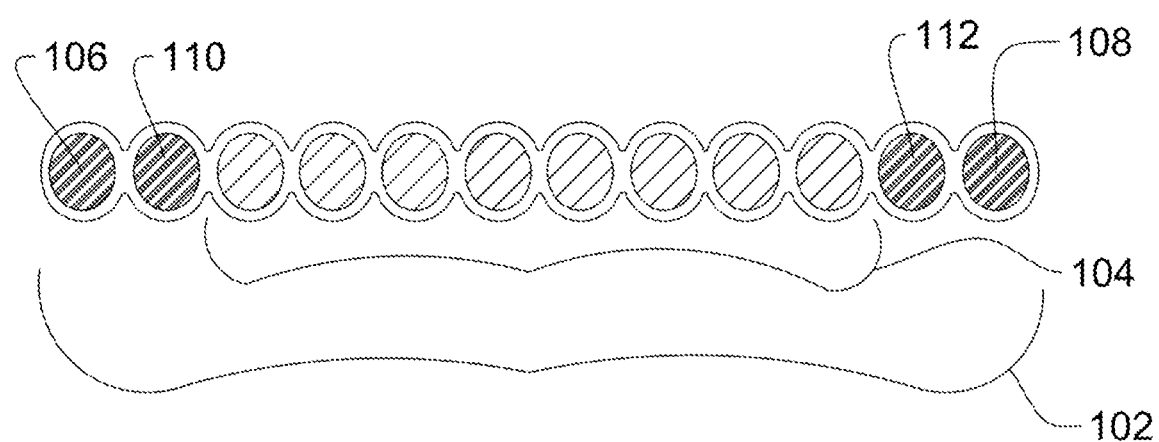
FIG. 1 illustrates a cross sectional view of an optical fiber ribbon, in accordance with an embodiment of the present disclosure.

It should be noted that the accompanying figures are intended to present illustrations of few exemplary embodiments of the present disclosure. These figures are not intended to limit the scope of the present disclosure. It should also be noted that accompanying figures are not necessarily drawn to scale.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention.

Reference in this specification to "one embodiment" or "an embodiment" means that a particular feature, structure, or characteristic described in connection with the embodiment is included in at least one embodiment of the present technology. The appearance of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

Reference will now be made in detail to selected embodiments of the present disclosure in conjunction with accompanying figures. The embodiments described herein are not intended to limit the scope of the disclosure, and the present disclosure should not be construed as limited to the embodiments described. This disclosure may be embodied in different forms without departing from the scope and spirit of the disclosure. It should be understood that the accompanying figures are intended and provided to illustrate embodiments of the disclosure described below and are not necessarily drawn to scale. In the drawings, like numbers refer to like elements throughout, and thicknesses and dimensions of some components may be exaggerated for providing better clarity and ease of understanding.

Moreover, although the following description contains many specifics for the purposes of illustration, anyone skilled in the art will appreciate that many variations and/or alterations to said details are within the scope of the present technology. Similarly, although many of the features of the present technology are described in terms of each other, or in conjunction with each other, one skilled in the art will appreciate that many of these features can be provided independently of other features. Accordingly, this description of the present technology is set forth without any loss of generality to, and without imposing limitations upon, the present technology.

It should be noted that the terms "first", "second", and the like, herein do not denote any order, ranking, quantity, or importance, but rather are used to distinguish one element from another. Further, the terms "a" and "an" herein do not denote a limitation of quantity, but rather denote the presence of at least one of the referenced item.

REFERENCE NUMERALS IN THE DRAWINGS

For a more complete understanding of the present invention parts, reference is now made to the following descriptions:
100. Optical fiber ribbon.
102. A plurality of optical fibers.
104. A plurality of bend sensitive optical fibers.
106. The first bend insensitive optical fiber.
108. The second bend insensitive optical fiber.
110. The third bend insensitive optical fiber.
112. The fourth bend insensitive optical fiber.
114. Optical fiber.
116. Optical fiber.
200. Stacking arrangement.
202. Optical fiber ribbon stack.
204. The first bendable optical fiber ribbon.
206. The second bendable optical fiber ribbon.
208. The third bendable optical fiber ribbon.
210. The fourth bendable optical fiber ribbon.
212. Optical fiber ribbons.

Referring to FIG. 1, this is a cross sectional view of an optical fiber ribbon 100, in accordance with an embodiment of the present disclosure. In general, optical fiber ribbon 100 includes a number of optical fibers arranged together within a coating material. In addition, the optical fiber ribbons 100 are used in optical fiber cables that require high fiber counts within less installation space. In general, optical fiber cables are used to transfer digital data signals in the form of light up to distances of hundreds of miles with higher throughput rates than those achievable via electrical communication cables. The optical fiber ribbon 100 enables mass fusion splicing. The optical fiber ribbon 100 includes a plurality of optical fibers 102. The plurality of optical fibers 102 includes a plurality of bend sensitive optical fibers 104, a first bend insensitive optical fiber 106, and a second bend insensitive optical fiber 108. In addition, the plurality of optical fibers 102 includes a third bend insensitive optical fiber 110 and a fourth bend insensitive optical fiber 112. In general, an optical fiber refers to a medium associated with transmission of information over long distances in the form of light pulses. Further, the optical fiber uses light to transmit voice and data communications over long distances. The optical fiber ribbon 100 has two corners. The first bend insensitive optical fiber 106 is placed at a first corner and the second bend insensitive optical fiber 108 is placed at a second corner.

In an embodiment of present disclosure, the plurality of optical fibers 102 placed in the middle of the optical fiber ribbon 100 may be bend insensitive optical fibers. In another embodiment of the present disclosure, the plurality of optical fibers 102 placed in the middle of the optical fiber ribbon 100 may be bend sensitive optical fibers. The optical fiber ribbon 100 is a bendable optical fiber ribbon. In general, the bendable optical fiber ribbon refers to a ribbon that can easily bend along preferential as well as non-preferential axis. The optical fiber ribbon 100 includes the plurality of bend sensitive optical fibers 104, the first bend insensitive optical fiber 106, and the second bend insensitive optical fiber 108, the third bend insensitive optical fiber 110 and the fourth bend insensitive optical fiber 112 in a linear manner. The plurality of optical fibers 102 are enclosed within a coating material. In general, the coating material provides various handling characteristics to the optical fiber ribbon. The various handling characteristics include encapsulation, easy peel and breakout, robustness and the like. In an embodiment of the present discourse, the optical fiber ribbon 100 has 12 optical fibers. In another embodiment of the present disclosure, the optical fiber ribbon 100 may have any number of optical fibers.

In general, bend insensitive optical fibers are fibers that can easily be bent in places with impossibly small radii without significant light loss. In addition, bend insensitive optical fibers are designed to be resistant to bend related mechanical and optical loss. Further, the bend insensitive optical fibers are widely used in premises installations like apartment buildings, and the like. In general, the bend sensitive optical fiber is a fiber that is highly sensitive to stress, particularly stress caused due to bending.

The plurality of bend sensitive optical fibers 104 are placed between the first bend insensitive optical fiber 106, the second bend insensitive optical fiber 108, the third bend insensitive optical fiber 110 and the fourth bend insensitive optical fiber 112. In an example, a bend radius of the first bend insensitive optical fiber 106, the second bend insensitive optical fiber 108, the third bend insensitive optical fiber 110 and the fourth bend insensitive optical fiber 112 is at least 5D, wherein D is a diameter of the optical fiber. In an example, the number of the plurality of optical fibers 102 in the optical fiber ribbon 100 is 12. Further, number of the plurality of bend sensitive optical fibers 104 is 8. The third bend insensitive optical fiber 110 lies adjacent to the first bend insensitive optical fiber 106 and the fourth bend insensitive optical fiber 112 lies adjacent to the second bend insensitive optical fiber 108. In an example, the optical fibers adjacent to bend insensitive optical fibers are bend insensitive such that four optical fibers in the optical fiber ribbon 100 are bend insensitive. In addition, two edge optical fibers on each end of the bendable optical fiber ribbon are bend insensitive. In an embodiment of the present disclosure, there may be more than two edge optical fibers which are bend insensitive.

In an embodiment of the present disclosure, the number of the plurality of optical fibers 102 in the optical fiber ribbon 100 may vary. In an embodiment of the present disclosure, the number of the plurality of bend sensitive optical fibers 104 may vary.

Further, each optical fiber of the plurality of bend sensitive optical fibers 104 is an ITU-T G.652 D fiber. Furthermore, the first bend insensitive optical fiber 106, the second bend insensitive optical fiber 108, the third bend insensitive optical fiber 110 and the fourth bend insensitive optical fiber 112 is an ITU-T G.657 A2 fiber. However, each optical fiber of the plurality of bend sensitive optical fibers 104 may be any other bend sensitive optical fiber. However, the first bend insensitive optical fiber 106, the second bend insensitive optical fiber 108, the third bend insensitive optical fiber 110 and the fourth bend insensitive optical fiber 112 may be any other bend insensitive fiber.

In addition, the first bend insensitive optical fiber 106, the second bend insensitive optical fiber 108, the third bend insensitive optical fiber 110 and the fourth bend insensitive optical fiber 112 comply with specific telecommunication standards. Also, each optical fiber of the plurality of bend sensitive optical fibers 104 complies with specific telecommunication standards. The telecommunication standards are defined by International Telecommunication Union-Telecommunication (hereinafter "ITU-T"). In an embodiment of the present disclosure, the first bend insensitive optical fiber 106, the second bend insensitive optical fiber 108, the third bend insensitive optical fiber 110 and the fourth bend insensitive optical fiber 112 are compliant with G.657 recommendation standard set by the ITU-T. In an embodiment of the present disclosure, each optical fiber of the plurality of bend sensitive optical fibers 104 is compliant with G.652 recommendation standard set by the ITU-T. Furthermore, the ITU-T G.657 recommendation describes a geometrical, mechanical and transmission characteristics of a single mode optical fiber. The ITU-T G.657 standard defines a plurality of optical characteristics associated with the plurality of bend insensitive optical fibers. Also, the ITU-T G.652 standard describes the geometrical, mechanical and transmission attributes of a single mode optical fiber.

In an embodiment of the present disclosure, each of the plurality of optical fibers 102 has a diameter in a range of about 180 micrometers to 220 micrometers. In another embodiment of the present disclosure, the diameter of each of the plurality of optical fibers 102 may vary. In an embodiment of the present disclosure, each of the plurality of optical fibers 102 is aligned at a pitch of about 180 micrometers to 250 micrometers. In general, pitch is distance between geometrical centers of any two optical fibers lying adjacent to each other. In an embodiment of the present disclosure, each of the plurality of optical fibers 102 along with the coating material has diameter of about 180 micrometers to 250 micrometers. In another embodiment of the present disclosure, the diameter of each of the plurality of optical fibers 102 along with the coating material may vary.

The optical fiber ribbon 100 has lower dimensions. In an embodiment of the present disclosure, the optical fiber ribbon 100 has width in a range of about 2.8 millimeters to 3.1 millimeters. In another embodiment of the present disclosure, the width of the optical fiber ribbon 100 may vary. In an embodiment of the present disclosure, the optical fiber ribbon 100 has height in a range of about 240 micrometers to 300 micrometers. In another embodiment of the present disclosure, the height of the optical fiber ribbon 100 may vary.

The optical fiber ribbon 100 is a flexible optical fiber ribbon. The first bend insensitive optical fiber 106, the second bend insensitive optical fiber 108, the third bend insensitive optical fiber 110 and the fourth bend insensitive optical fiber 112 facilitate in reduction of stress developed on the optical fiber ribbon 100. In an example, the optical fiber ribbon 100 reduces stress when installed in compact structure cables. The optical fiber ribbon 100 has capability of transmitting signals with less attenuation. In general, attenuation is the reduction of amplitude of a signal, electric current, or any other oscillation. The optical fiber ribbon 100 has a high data transmission with good transmission rate.

Figure 2:
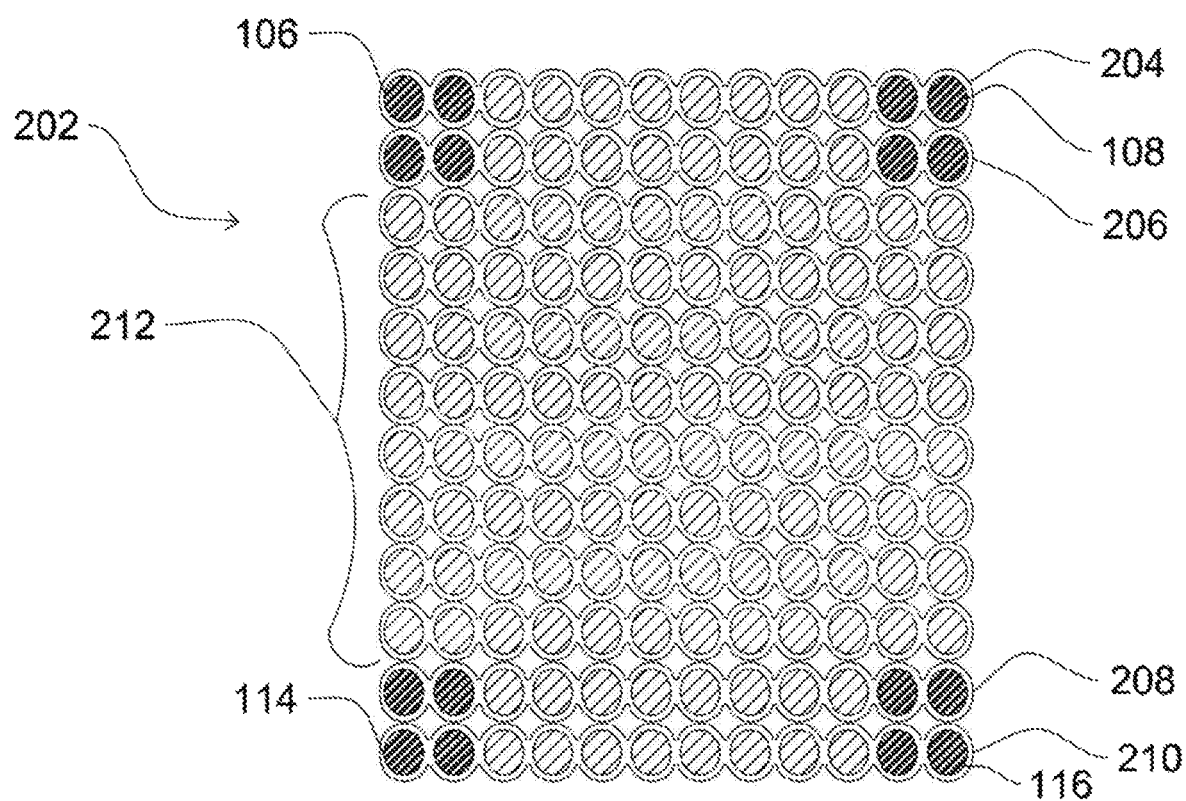
FIG. 2 illustrates a stacking arrangement of an optical fiber ribbon stack, in accordance with an embodiment of the present disclosure.

Referring to FIG. 2, this a stacking arrangement 200 of the optical fiber ribbon stack 202, in accordance with an embodiment of the present disclosure. The optical fiber ribbon stack 202 includes a total of 12 optical fiber ribbons. The optical fiber ribbon stack 202 includes 4 bendable optical fiber ribbons of the FIG. 1 and 8 optical fiber ribbons 212.

The four bendable optical fiber ribbons includes a first bendable optical fiber ribbon 204, a second bendable optical fiber ribbon 206, a third bendable optical fiber ribbon 208 and a fourth bendable optical fiber ribbon 210. The first bendable optical fiber ribbon 204, the second bendable optical fiber ribbon 206, the third bendable optical fiber ribbon 208 and the fourth bendable optical fiber ribbon 210 include optical fibers at corners. The first bendable optical fiber ribbon 204 and the second bendable optical fiber ribbon 206 are the two topmost fiber ribbons of the optical fiber ribbon stack 202. The third bendable optical fiber ribbon 208 and the fourth bendable optical fiber ribbon 210 are the two bottommost fiber ribbons of the optical fiber ribbon stack 202. The first bendable optical fiber ribbon 204 and the second bendable optical fiber ribbon 206 are adjacent to each other. The third bendable optical fiber ribbon 208 and the fourth bendable optical fiber ribbon 210 are adjacent to each other. In addition, two edge optical fibers on each end of the first bendable optical fiber ribbon 204 and the second bendable optical fiber ribbon 206 are bend insensitive. Moreover, two edge optical fibers on each end of the third bendable optical fiber ribbon 208 and the second bendable optical fiber ribbon 210 are bend insensitive. So, there are a total of 16 bend insensitive optical fibers in the optical fiber ribbon stack 202. In an embodiment of the present disclosure, each optical fiber in each of the plurality of optical fiber ribbons 212 may be a bend sensitive fiber. Each of the plurality of optical fiber ribbons 212 is a typical optical fiber ribbon. In another embodiment of the present disclosure, each optical fiber in each of the plurality of optical fiber ribbons 212 may not be a bend sensitive fiber.

The optical fiber ribbon stack 202 includes at least four corners. The optical fiber ribbon stack 202 includes an optical fiber 106, an optical fiber 108, an optical fiber 114 and an optical fiber 116 placed at the corresponding four corners of the optical fiber ribbon stack 202. Each optical fiber 106, 108, 114, 116 at the corresponding four corners of the optical fiber ribbon stack 202 is a bend insensitive optical fiber. The optical fiber ribbon stack 202 includes one or more optical fibers placed adjacent to the optical fibers 106, 108, 114, 116 at the corresponding four corners of the optical fiber ribbon stack 202. In addition, the one or more optical fibers adjacent to the optical fibers 106, 108, 114, 116 are placed horizontally, vertically and diagonally to the corresponding optical fibers 106, 108, 114, 116 at the corresponding four corners of the optical fiber ribbon stack 202. Moreover, the one or more optical fibers adjacent to the optical fibers 106, 108, 114, 116 are bend insensitive optical fibers. Further, the one or more optical fibers adjacent to the optical fibers 106, 108, 114, 116 are placed in such a way that group of bend insensitive optical fibers on the corresponding four corners of the optical fiber ribbon stack 202 is in the form of square matrix (as shown in FIG. 3).

In an embodiment of the present disclosure, the optical fiber ribbon stack 202 has a width in a range of about 5.8 millimeters to 6.2 millimeters. In another embodiment of the present disclosure, the width of the optical fiber ribbon stack 202 may vary. In an embodiment of the present disclosure, the optical fiber ribbon stack 202 has a height in a range of about 5.8 millimeters to 6.2 millimeters. In another embodiment of the present disclosure, the height of the optical fiber ribbon stack 202 may vary.

Figure 3:
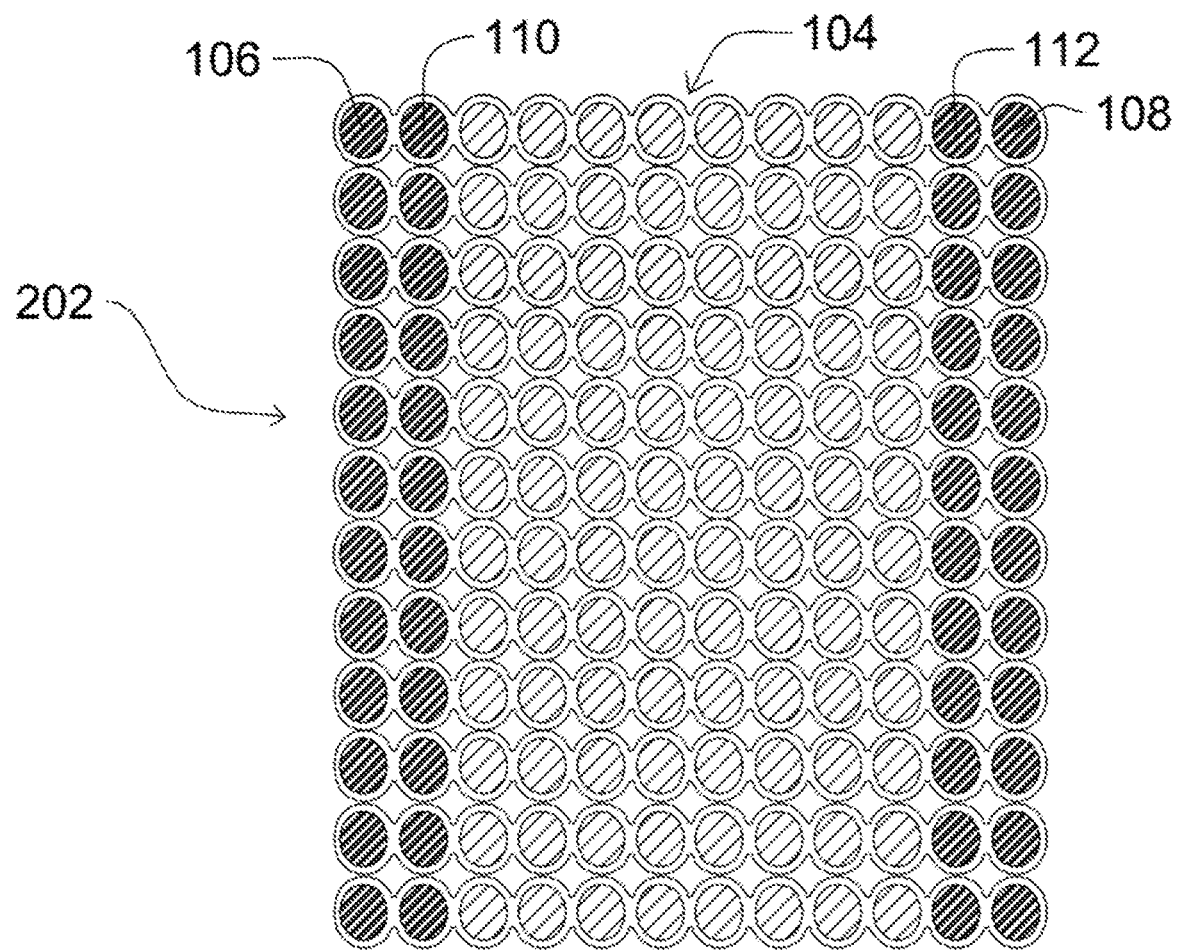
FIG. 3 illustrates another stacking arrangement of an optical fiber ribbon stack, in accordance with another embodiment of the present disclosure.

Referring to FIG. 3, this is another stacking arrangement 300 of the optical fiber ribbon stack 202, in accordance with another embodiment of the present disclosure. The stacking arrangement 300 of the optical fiber ribbon stack 202 can be used for a buffer tube of an optical fiber cable. In an embodiment of the present disclosure, the stacking arrangement 300 of the optical fiber ribbon stack 302 may be utilized in multitube cables, central tube cables and the like. The optical fiber ribbon stack 202 is made up of 12 bendable optical fiber ribbons shown in FIG. 1.

The optical fiber ribbon stack 202 includes at least two types of optical fiber ribbon. The at least two types of the optical fiber ribbon includes type A and type B. The optical fiber ribbon stack 202 includes at least four bendable optical fiber ribbon of type A. In addition, at least two edge optical fibers on each end of the four bendable optical fiber ribbon of type A are bend insensitive. Here, the at least two edge optical fibers on each end of the four bendable optical fiber ribbon of type A refer to the first bend insensitive optical fiber 106 and the second bend insensitive optical fiber 108. In addition, the at least two edge optical fibers each end of the four bendable optical fiber ribbon of type A refer to the third bend insensitive optical fiber 110 and the fourth bend insensitive optical fiber 112. In FIG. 2, each of the plurality of optical fiber ribbon of the optical fiber ribbon stack 202 is type A bendable optical fiber ribbon with bend insensitive optical fibers at two edges on each end of each of the plurality of optical fiber ribbons.

Furthermore, the optical fiber ribbon stack 202 includes one or more bendable optical fiber ribbon of type B. Each optical fiber of a plurality of optical fibers in the one or more bendable optical fiber ribbon may be a bend sensitive fiber (as shown in FIG. 2). The optical fiber ribbon stack 202 is arranged in such a way that at least two bendable optical fiber ribbon of the plurality of bendable optical fiber ribbons on a first end of the optical fiber ribbon stack 202 and at least two bendable optical fiber ribbon of the plurality of bendable optical fiber ribbons on a second end of the optical fiber ribbon stack are of the type A. In addition, at least four optical fibers on each corner of the optical fiber ribbon stack are bend insensitive. The first end is a topmost end of the optical fiber ribbon stack 202 and the second end is a bottommost end of the optical fiber ribbon stack 202.

Each of the 12 bendable optical fiber ribbons includes the plurality of bend sensitive optical fibers 104, the first bend insensitive optical fiber 106 and the second bend insensitive optical fiber 108. In addition, each of the 12 bendable optical fiber ribbons includes the third bend insensitive optical fiber 110 and the fourth bend insensitive optical fiber 112. In another embodiment of the present disclosure, number of the bendable optical fiber ribbon may vary. In an embodiment of the present disclosure, the optical fiber ribbon stack 202 is a square shaped ribbon stack.

The square shaped stacking arrangement enables maximum packing efficiency in any rectangular stacking arrangement of the ribbons. In an embodiment of the present disclosure, the plurality of optical fibers in the optical fiber ribbon stack 202 is 144. In another embodiment of the present disclosure, number of the plurality of optical fibers in the optical fiber ribbon stack 202 may vary. In addition, two edge optical fibers of each bendable optical fiber ribbon of the optical fiber ribbon stack 202 are bend insensitive optical fibers. Further, 8 optical fibers of each bendable optical fiber ribbon of the optical fiber ribbon stack 202 are bend sensitive. In an embodiment of the present disclosure, the one or more bendable optical fiber ribbon of the type B are stacked in between the at least four bendable optical fiber ribbon of the type A.

The stacking arrangement of the optical fiber ribbon stack has numerous advantages over the prior art. The stacking arrangement of the optical fiber ribbon stack enables reduction in diameter of optical fiber cables. The use of bend insensitive optical fibers on corners of the optical fiber ribbon stack allows lowers down the inner diameter of the buffer tube for same stack size. The stacking arrangement enables cables with high fiber counts. Since the ribbons are arranged in buffer tube with smaller inner diameter, more number of fibers can be inserted in smaller diameter cables. The stacking arrangement enables reduction in attenuation on fibers at the corners of the ribbon stack. The use of bend insensitive optical fibers on the corners of the ribbon stack reduces attenuation on the corner due to micro bending.

According to FIG. 1, it is shown that the plurality of bend sensitive optical fibers 104 are placed between the first bend insensitive optical fiber 106, the second bend insensitive optical fiber 108, the third bend insensitive optical fiber 110, the fourth bend insensitive optical fiber 112; however, those skilled in the art would appreciate that there may be any set of first bend insensitive optical fiber 106, the second bend insensitive optical fiber 108, the third bend insensitive optical fiber 110, the fourth bend insensitive optical fiber 112. The set of the first bend insensitive optical fiber 106 may include any number of first bend insensitive optical fibers. The set of the second bend insensitive optical fiber 108 may include any number of second bend insensitive optical fibers. The set of the third bend insensitive optical fiber 110 may include any number of first bend insensitive optical fibers. The set of the fourth bend insensitive optical fiber 112 may include any number of second bend insensitive optical fibers.

Although, the present disclosure has been explained in relation to its preferred embodiment(s) as mentioned above, it is to be understood that many other possible modifications and variations can be made without departing from the spirit and scope of the inventive aspects of the present invention. It is, therefore, contemplated that the appended claim or claims will cover such modifications and variations that fall within the true scope of the invention.

What is claimed is:

1. A stacking arrangement of an optical fiber ribbon in a buffer tube of an optical fiber cable comprising:
   an optical fiber ribbon stack, wherein the optical fiber ribbon stack comprising at least four corners, wherein each corner of the at least four corners is defined by a plurality of optical fibers, wherein the plurality of optical fibers corresponding to each corners of at least four corners are bend insensitive fibers, wherein a bend radius of each bend insensitive fiber is at least 5D, wherein D is a diameter of the optical fiber, and wherein two edge optical fibers of the plurality of optical fibers on each end of first two bendable optical fiber ribbons and last two bendable optical fiber ribbons of the optical fiber ribbon stack are the bend insensitive fibers.

2. The stacking arrangement of the optical fiber ribbon as claimed in claim 1, wherein the plurality of bend insensitive optical fibers corresponding to each of the four corners form a square arrangement at the corresponding corner.

3. The stacking arrangement of the optical fiber ribbon as claimed in claim 1, wherein the optical fiber ribbon stack comprises a plurality of bendable optical fiber ribbons, wherein the bendable optical fiber ribbons is intermittently bonded ribbon, tru-ribbon or flat ribbon.

4. The stacking arrangement of the optical fiber ribbon as claimed in claim 1, wherein the optical fiber ribbon stack is a square shaped ribbon stack.

5. The stacking arrangement of the optical fiber ribbon as claimed in claim 1, wherein each optical fiber in the plurality of optical fiber ribbons has a diameter in a range of 180 micrometers to 220 micrometers.

6. The stacking arrangement of the optical fiber ribbon as claimed in claim 1, wherein the optical fiber ribbon has a width in a range of 2.8 millimeters to 3.1 millimeters.

7. The stacking arrangement of the optical fiber ribbon as claimed in claim 1, wherein the optical fiber ribbon has a height in a range of 220 micrometers to 300 micrometers.

8. The stacking arrangement of the optical fiber ribbon as claimed in claim 1, wherein the optical fiber ribbon stack has a width in a range of 5.8 millimeters to 6.2 millimeters.

9. The stacking arrangement of the optical fiber ribbon as claimed in claim 1, wherein the optical fiber ribbon stack has a height in a range of 5.8 millimeters to 6.2 millimeters.

10. A stacking arrangement of an optical fiber ribbon in a buffer tube of an optical fiber cable, comprising:

an optical fiber ribbon stack, wherein the optical fiber ribbon stack comprising at least four corners, wherein each corner of the at least four corners is defined by a plurality of optical fibers, wherein the plurality of optical fibers corresponding to each corners of at least four corners are bend insensitive fibers, wherein a bend radius of each bend insensitive fiber is at least 5D, wherein D is a diameter of the optical fiber, and wherein two edge optical fibers of the plurality of optical fibers on each end of first two bendable optical fiber ribbons and last two bendable optical fiber ribbons of the optical fiber ribbon stack are the bend insensitive fibers, wherein the bend insensitive fiber corresponding to each of the four corners form a square arrangement at the corresponding corner.

11. The stacking arrangement of the optical fiber ribbon as claimed in claim 10, wherein each optical fiber in the plurality of optical fibers ribbons has a diameter in a range of 180 micrometers to 220 micrometers.

12. The stacking arrangement of the optical fiber ribbon as claimed in claim 10, wherein the optical fiber ribbon has a width in a range of 2.8 millimeters to 3.1 millimeters and a height in a range of 220 micrometers to 300 micrometers.

* * * * *